US012641604B2

(12) United States Patent
Lei

(10) Patent No.: US 12,641,604 B2
(45) Date of Patent: May 26, 2026

(54) COOPERATIVE COMMUNICATION IMPLEMENTATION METHOD, DEVICE, AND STORAGE MEDIUM

(71) Applicant: ZTE CORPORATION, Shenzhen (CN)

(72) Inventor: Chaoqin Lei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 392 days.

(21) Appl. No.: 18/547,074

(22) PCT Filed: Dec. 2, 2021

(86) PCT No.: PCT/CN2021/135104
§ 371 (c)(1),
(2) Date: Aug. 18, 2023

(87) PCT Pub. No.: WO2022/174647
PCT Pub. Date: Aug. 25, 2022

(65) Prior Publication Data
US 2024/0129918 A1 Apr. 18, 2024

(30) Foreign Application Priority Data

Feb. 22, 2021 (CN) .......................... 202110196198.5

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04W 72/0473* (2013.01); *H04W 72/232* (2023.01)

(58) Field of Classification Search
None
See application file for complete search history.

(56) References Cited

U.S. PATENT DOCUMENTS

2019/0246378 A1 8/2019 Islam et al.
2020/0022121 A1 1/2020 Li et al.
(Continued)

FOREIGN PATENT DOCUMENTS

CN 108631934 A 10/2018
CN 109152069 A 1/2019
(Continued)

OTHER PUBLICATIONS

3GPP Technical Specification Group Radio Access Network. "Discussion on impact of multi-TRP operation on RAN2," 3GPP TSG-RAN WG2 Meeting #107, Aug. 2019, pp. 1-4.
(Continued)

*Primary Examiner* — Kouroush Mohebbi
(74) *Attorney, Agent, or Firm* — Vivacqua Crane, PLLC

(57) ABSTRACT

Disclosed are a method for implementing cooperative communication, a device, and a storage medium. The method may include: determining a transmission parameter between the primary cell and the coordination cell, the transmission parameter represents transmission performance between the primary cell and the coordination cell; determining a target cooperation mode according to the transmission parameter, and sending the target cooperation mode to the coordination cell; and performing communication with the UE through cooperation with the coordination cell according to the target cooperation mode.

14 Claims, 9 Drawing Sheets

(51) Int. Cl.
*H04W 72/044* (2023.01)
*H04W 72/232* (2023.01)

(56) References Cited

U.S. PATENT DOCUMENTS

| | | |
|---|---|---|
| 2020/0120679 A1 | 4/2020 | Wang et al. |
| 2020/0383091 A1 | 12/2020 | Park et al. |
| 2021/0014727 A1* | 1/2021 | Wang .................... H04L 1/1825 |
| 2021/0037551 A1 | 2/2021 | Khoshnevisan et al. |

FOREIGN PATENT DOCUMENTS

| | | |
|---|---|---|
| CN | 110945823 A | 3/2020 |
| EP | 3337232 A1 | 6/2018 |
| WO | 2020087350 A1 | 5/2020 |

OTHER PUBLICATIONS

3GPP Technical Specification Group Radio Access Network. "On multi-TRP enhancements for NR MIMO in Rel. 16," 3GPP TSG RAN WG1 Meeting #98bis, Oct. 2019, pp. 1-11.
European Patent Office. Extended European Search Report for EP Application No. 21926361.3, mailed Jun. 26, 2024, pp. 1-13.
3GPP Technical Specification Group Radio Access Network. "Remaining details on multi-TRP transmission," 3GPP TSG RAN WG1 Meeting #90, Aug. 2017, pp. 1-4.
International Searching Authority. International Search Report and Written Opinion for PCT Application No. PCT/CN2021/135104 and English translation, mailed Feb. 23, 2022, pp. 1-10.

* cited by examiner

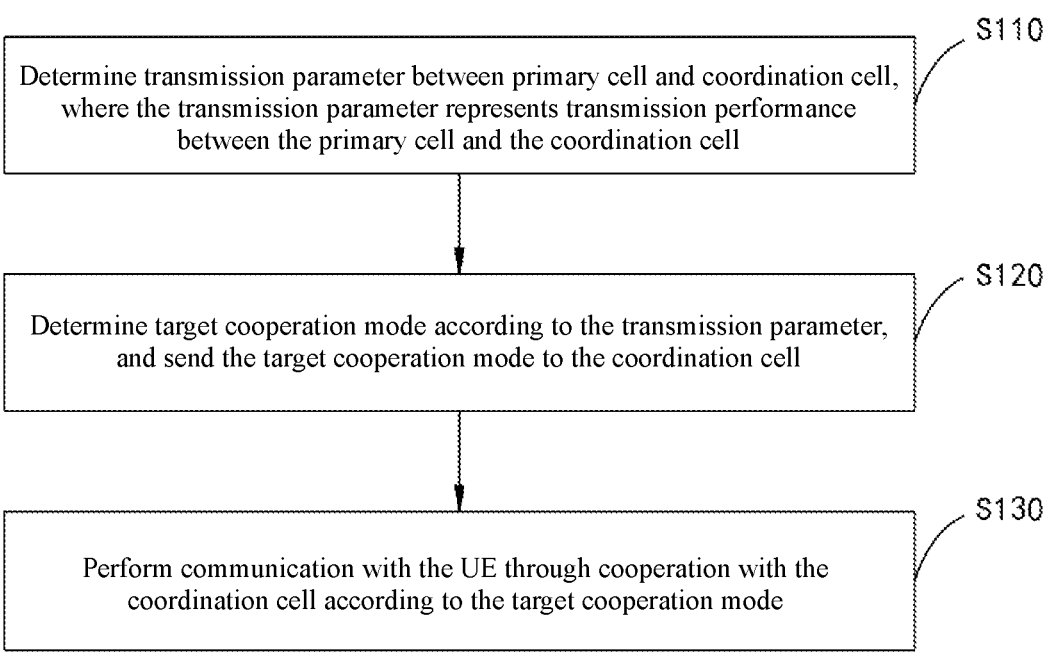

Determine transmission parameter between primary cell and coordination cell, where the transmission parameter represents transmission performance between the primary cell and the coordination cell — S110

Determine target cooperation mode according to the transmission parameter, and send the target cooperation mode to the coordination cell — S120

Perform communication with the UE through cooperation with the coordination cell according to the target cooperation mode — S130

FIG. 1

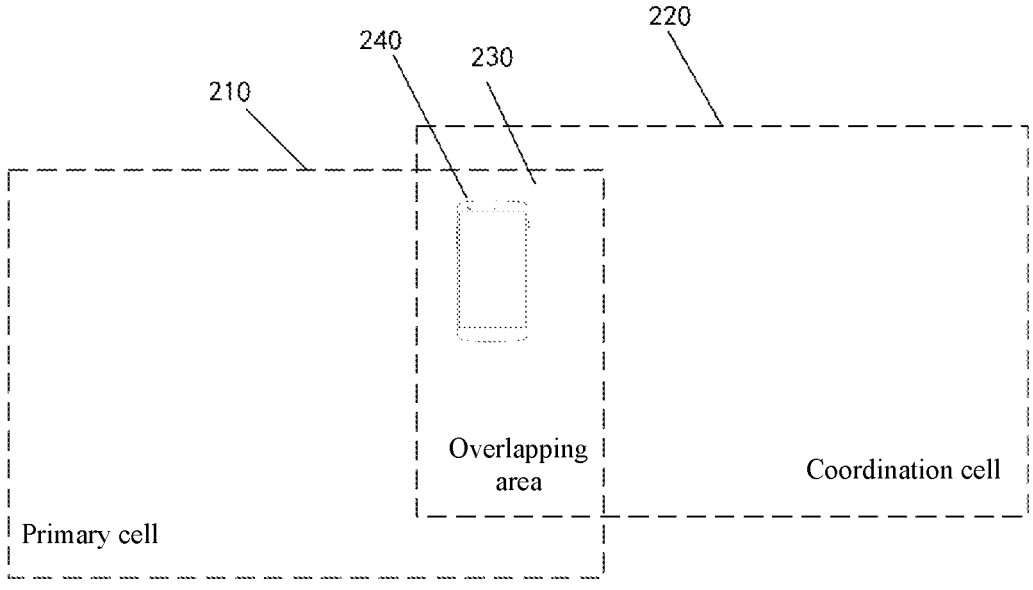

210    240    230    220

Overlapping area

Coordination cell

Primary cell

FIG. 2

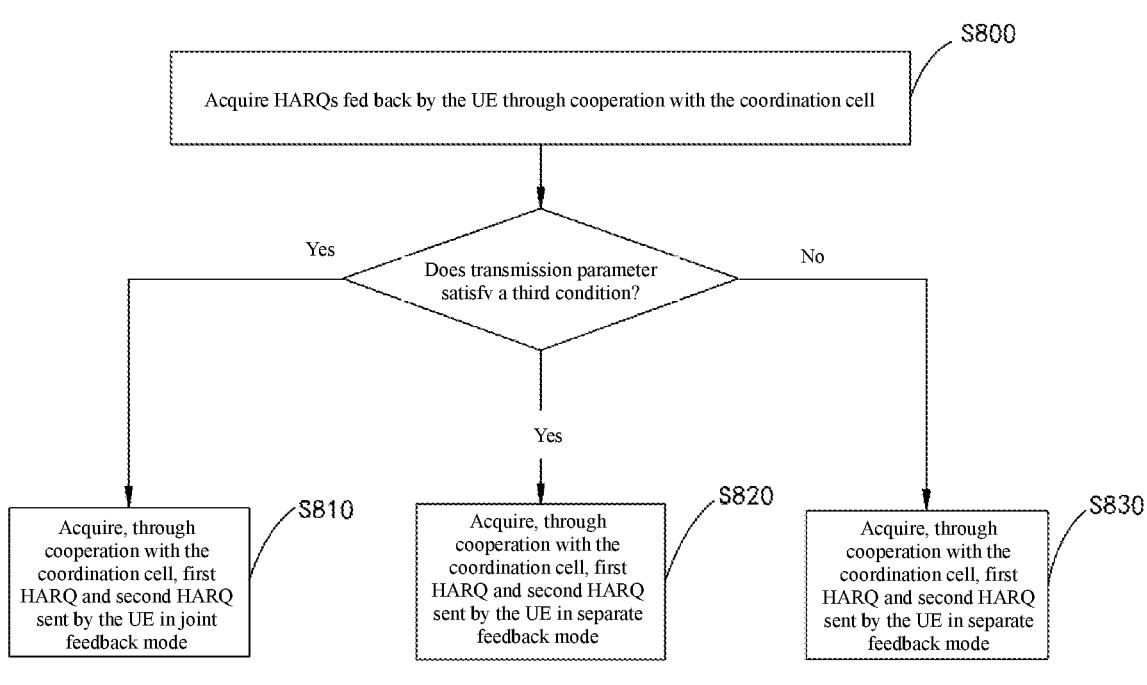

S800

Acquire HARQs fed back by the UE through cooperation with the coordination cell

Yes          Does transmission parameter satisfv a third condition?          No

Yes

S810

Acquire, through cooperation with the coordination cell, first HARQ and second HARQ sent by the UE in joint feedback mode

S820

Acquire, through cooperation with the coordination cell, first HARQ and second HARQ sent by the UE in separate feedback mode

S830

Acquire, through cooperation with the coordination cell, first HARQ and second HARQ sent by the UE in separate feedback mode

FIG. 8

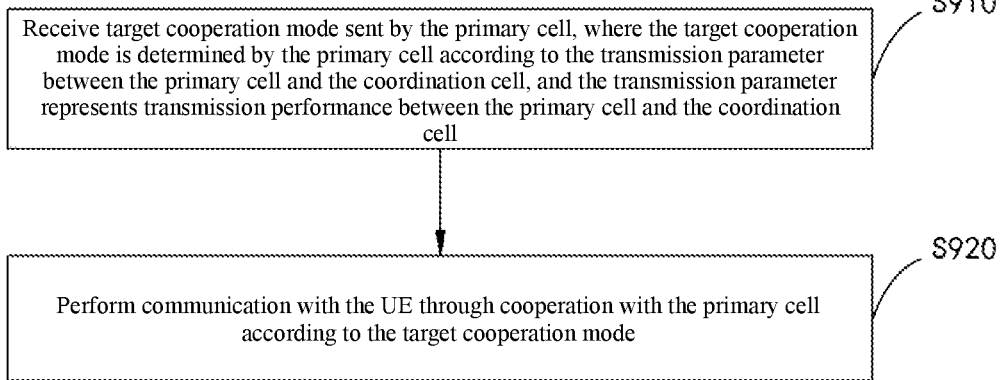

S910

Receive target cooperation mode sent by the primary cell, where the target cooperation mode is determined by the primary cell according to the transmission parameter between the primary cell and the coordination cell, and the transmission parameter represents transmission performance between the primary cell and the coordination cell

S920

Perform communication with the UE through cooperation with the primary cell according to the target cooperation mode

FIG. 9

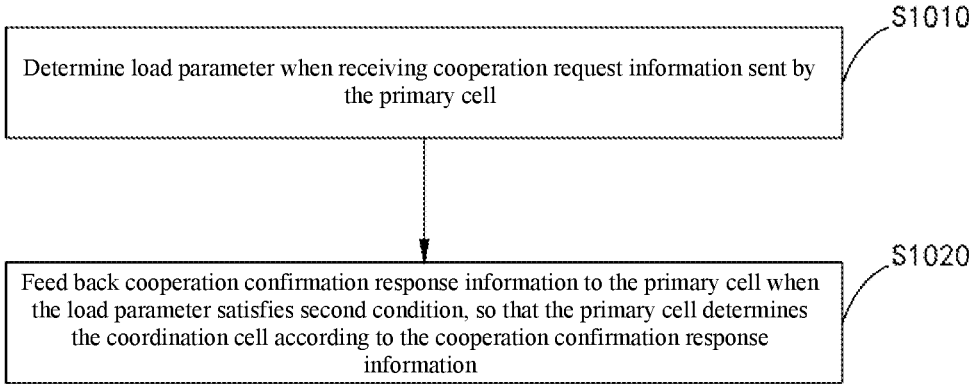

S1010

Determine load parameter when receiving cooperation request information sent by the primary cell

S1020

Feed back cooperation confirmation response information to the primary cell when the load parameter satisfies second condition, so that the primary cell determines the coordination cell according to the cooperation confirmation response information

Send data of PDSCH to UE through cooperation with the primary cell in a case that the primary cell sends the PDCCH to the UE, where the PDSCH is scheduled by the PDCCH, and data of PDSCH sent by the primary cell and data of PDSCH sent by the coordination cell are from different layers of the PDSCH

FIG. 11

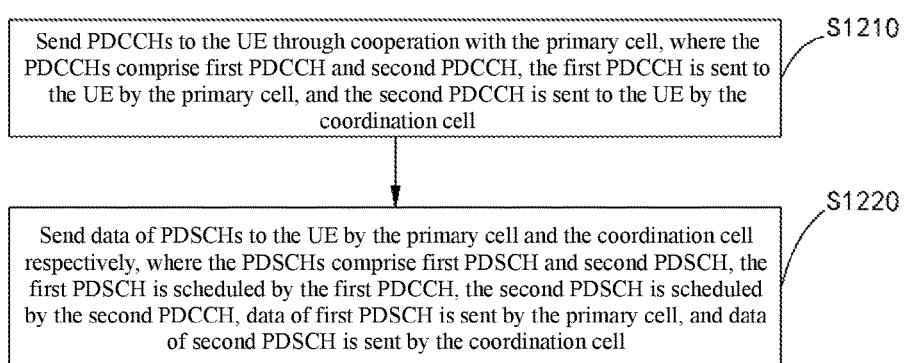

S1210

Send PDCCHs to the UE through cooperation with the primary cell, where the PDCCHs comprise first PDCCH and second PDCCH, the first PDCCH is sent to the UE by the primary cell, and the second PDCCH is sent to the UE by the coordination cell

S1220

Send data of PDSCHs to the UE by the primary cell and the coordination cell respectively, where the PDSCHs comprise first PDSCH and second PDSCH, the first PDSCH is scheduled by the first PDCCH, the second PDSCH is scheduled by the second PDCCH, data of first PDSCH is sent by the primary cell, and data of second PDSCH is sent by the coordination cell

FIG. 12

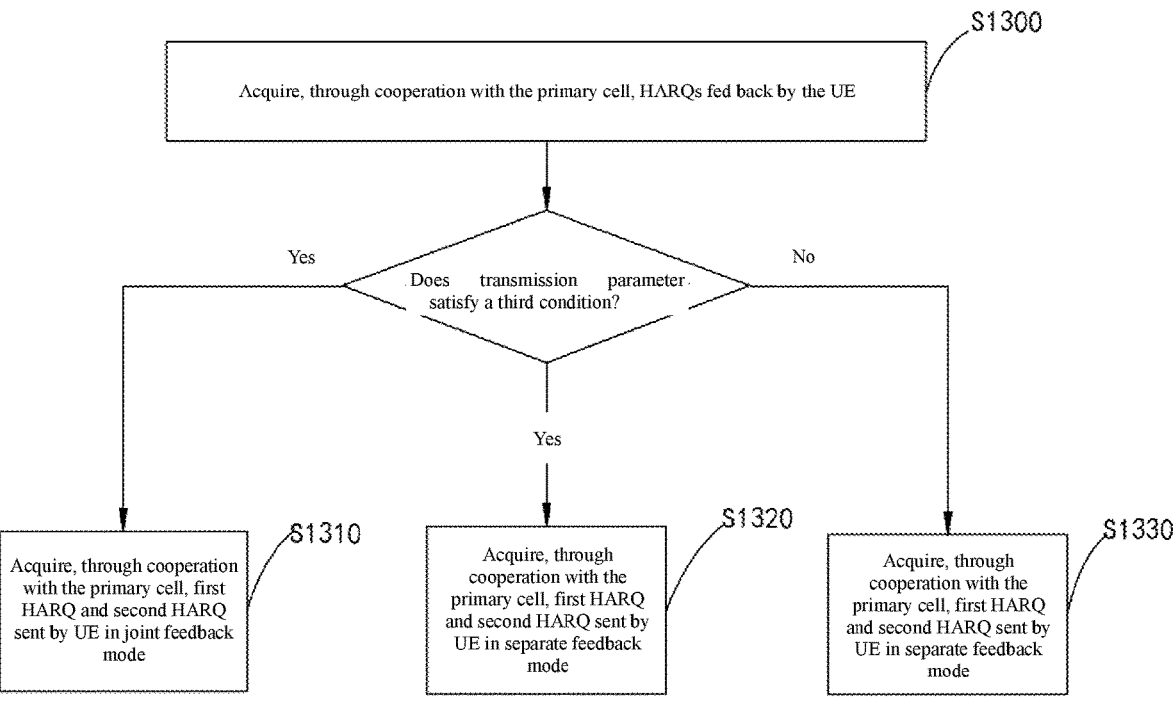

S1300

Acquire, through cooperation with the primary cell, HARQs fed back by the UE

Yes                    Does transmission parameter satisfy a third condition?                    No Yes

S1310

Acquire, through cooperation with the primary cell, first HARQ and second HARQ sent by UE in joint feedback mode

S1320

Acquire, through cooperation with the primary cell, first HARQ and second HARQ sent by UE in separate feedback mode

S1330

Acquire, through cooperation with the primary cell, first HARQ and second HARQ sent by UE in separate feedback mode

FIG. 13

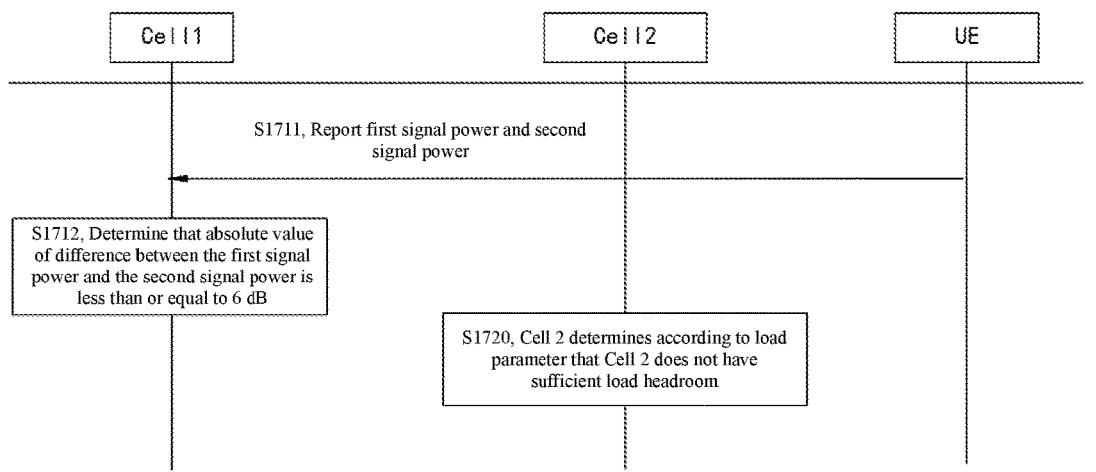

```
    Cell 1                    Cell 2                    UE
      |                         |                         |
      |  S1611, Report first signal power and second      |
      |<─────────── signal power ─────────────────────────|
      |                         |                         |
┌─────────────────────┐         |                         |
│ S1612, Determine that absolute value                    |
│ of difference between the first signal                  |
│ power and the second signal power is                    |
│ less than or equal to 6 dB                              |
└─────────────────────┘         |                         |
      |           ┌────────────────────────────────┐      |
      |           │ S1620, Cell 2 determines to implement │
      |           │ cooperative communication together    │
      |           │ with Cell 1 according to load parameter│
      |           └────────────────────────────────┘      |
┌──────────────────────────────┐|                         |
│ S1630, Determine that transmission                      |
│ latency between Cell 1 and Cell 2 is                    |
│ non-ideal transmission latency, and                     |
│ determine to use the multi-PDCCH                        |
│ MTRP mode                                               |
└──────────────────────────────┘|                         |
      |  S1641, Send first PDCCH |                         |
      |────────────────────────────────────────────────> |
      |                         |  S1642, Send second PDCCH|
      |                         |────────────────────────>|
      |  S1651, Send first PDCCH |                         |
      |────────────────────────────────────────────────> |
      |                         |  S1652, Send second PDSCH|
      |                         |────────────────────────>|
      |                         |        ┌──────────────────┐
      |<────────────────────────────────│ S1660, Send first│
      |                         |<───────│ HARQ and second  │
      |                         |        │ HARQ in separate │
      |                         |        │ feedback mode    │
      |                         |        └──────────────────┘
```

FIG. 16

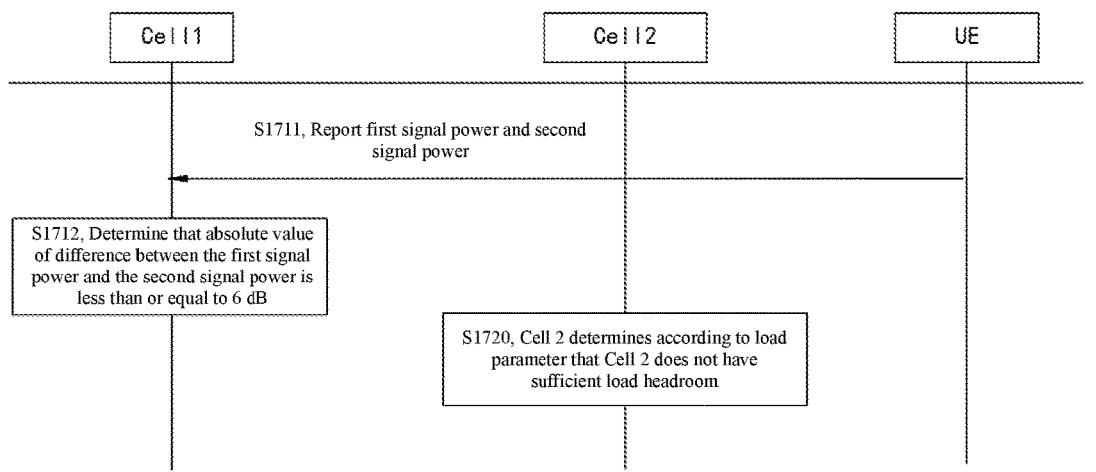

```
    Cell 1                    Cell 2                    UE
      |                         |                         |
      |  S1711, Report first signal power and second      |
      |<─────────── signal power ─────────────────────────|
      |                         |                         |
┌─────────────────────┐         |                         |
│ S1712, Determine that absolute value                    |
│ of difference between the first signal                  |
│ power and the second signal power is                    |
│ less than or equal to 6 dB                              |
└─────────────────────┘         |                         |
      |        ┌────────────────────────────────┐         |
      |        │ S1720, Cell 2 determines according to load│
      |        │ parameter that Cell 2 does not have       │
      |        │ sufficient load headroom                  │
      |        └────────────────────────────────┘         |
      |                         |                         |
```

FIG. 17

COOPERATIVE COMMUNICATION IMPLEMENTATION METHOD, DEVICE, AND STORAGE MEDIUM

CROSS-REFERENCE TO RELATED APPLICATION

This application is a national stage filing under 35 U.S.C. § 371 of international application number PCT/CN2021/135104, filed Dec. 2, 2021, which claims priority to Chinese patent application No. 202110196198.5, filed Feb. 22, 2021. The contents of these applications are incorporated herein by reference in their entirety.

TECHNICAL FIELD

The present disclosure relates to, but not limited to, the field of wireless communication, and more particularly, to a method for implementing cooperative communication, a device, and a storage medium.

BACKGROUND

With the development of 5th Generation mobile communication (5G), the 3rd Generation Partnership Project (3GPP) has proposed Multiple Transmission/Reception Point (MTRP) in related protocols. MTRP can not only support the transmission of data at different nodes, but also support the transmission of Physical Downlink Control Channel (PDCCH) scheduling information at different Transmission/Reception Points (TRPs). Based on the MTRP technology, a user equipment (UE) is located in an overlapping area of at least two cells, and a coordination cell can perform cooperative communication for the UE in a primary cell to increase data throughput of UE. MTRP includes a single-PDCCH MTRP mode and a multi-PDCCH MTRP mode. However, in existing related standards, cases where the primary cell and the coordination cell use the single-PDCCH MTRP mode and cases where the primary cell and the coordination cell use the multi-PDCCH MTRP mode are not clearly specified.

SUMMARY

The following is a summary of the subject matter set forth in the description. This summary is not intended to limit the scope of protection of the claims.

Embodiments of the present disclosure provide a method for implementing cooperative communication, a device, and a storage medium.

In accordance with a first aspect of the present disclosure, an embodiment provides a method for implementing cooperative communication, which is applied to a network device of a primary cell. The primary cell is a home cell of a UE. The method for implementing cooperative communication includes: determining a coordination cell of the UE; determining a transmission parameter between the primary cell and the coordination cell, where the transmission parameter represents transmission performance between the primary cell and the coordination cell; determining a target cooperation mode according to the transmission parameter, and sending the target cooperation mode to the coordination cell; and performing communication with the UE through cooperation with the coordination cell according to the target cooperation mode.

In accordance with a second aspect of the present disclosure, an embodiment further provides a method for implementing cooperative communication, which is applied to a network device of a coordination cell. The coordination cell is a coordination cell of a primary cell in which a UE is homed. The method includes: receiving a target cooperation mode sent by the primary cell, where the target cooperation mode is determined by the primary cell according to the transmission parameter between the primary cell and the coordination cell, and the transmission parameter represents transmission performance between the primary cell and the coordination cell; and performing communication with the UE through cooperation with the primary cell according to the target cooperation mode.

In accordance with a third aspect of the present disclosure, an embodiment further provides a network device. The device includes: a memory, a processor, and a computer program stored in the memory and executable by the processor, where the computer program, when executed by the processor, causes the processor to implement the method for implementing cooperative communication in accordance with the first aspect or the method for implementing cooperative communication in accordance with the second aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims, and accompanying drawings.

BRIEF DESCRIPTION OF DRAWINGS

The drawings are provided for a further understanding of the technical schemes of the present disclosure, and constitute a part of the description. The drawings and the embodiments of the present disclosure are used to illustrate the technical schemes of the present disclosure, and do not constitute a limitation to the technical schemes of the present disclosure.

FIG. 1 is a flowchart of a method for implementing cooperative communication applied to a network device of a primary cell according to an embodiment of the present disclosure;

FIG. 2 is a schematic diagram of a positional relationship among a primary cell, a coordination cell, and a UE according to another embodiment of the present disclosure;

FIG. 8 is a flowchart of determining a Hybrid Automatic Repeat Request (HARM) feedback mode according to another embodiment of the present disclosure;

FIG. 9 is a flowchart of a method for implementing cooperative communication applied to a network device of a coordination cell according to another embodiment of the present disclosure;

FIG. 10 is a flowchart of feeding back cooperation confirmation response information by a coordination cell according to another embodiment of the present disclosure;

FIG. 11 is a flowchart of communication in a single-PDCCH MTRP mode according to another embodiment of the present disclosure;

FIG. 12 is a flowchart of communication in a multi-PDCCH MTRP mode according to another embodiment of the present disclosure;

FIG. 13 is a flowchart of determining a HARQ feedback mode according to another embodiment of the present disclosure;

FIG. 16 is an example flowchart of a method for implementing cooperative communication according to another embodiment of the present disclosure;

FIG. 17 is an example flowchart of a method for implementing cooperative communication according to another embodiment of the present disclosure.

DETAILED DESCRIPTION

Figure 3:
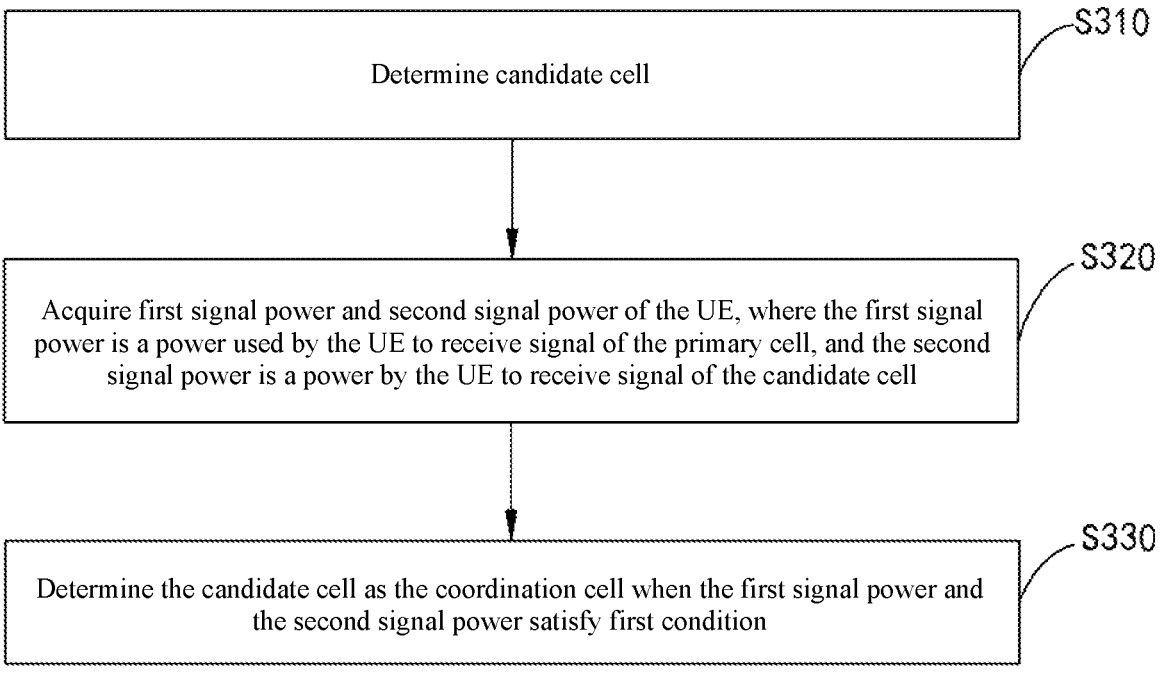
FIG. 3 is a flowchart of determining a coordination cell according to another embodiment of the present disclosure.

To make the objects, technical schemes, and advantages of the present disclosure clear, the present disclosure is described in further detail in conjunction with accompanying drawings and examples. It should be understood that the embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as "first", "second" and the like in the description, the claims, and the accompanying drawings are used to distinguish similar objects, and are not necessarily used to describe a specific sequence or a precedence order.

Embodiments of the present disclosure provide a method for implementing cooperative communication, a network device, and a storage medium. The method for implementing cooperative communication includes: determining a coordination cell of the UE; determining a transmission parameter between the primary cell and the coordination cell, where the transmission parameter represents transmission performance between the primary cell and the coordination cell; determining a target cooperation mode according to the transmission parameter, and sending the target cooperation mode to the coordination cell; and performing communication with the UE through cooperation with the coordination cell according to the target cooperation mode. According to the scheme provided by the embodiments of the present disclosure, the target cooperation mode between the primary cell and the coordination cell can be determined, to maximize the utilization of cell resources and increase the throughput of the UE.

It should be noted that a cell in the embodiments of the present disclosure can be understood to be described from the perspective of resource management or mobility man-agement or a service unit at a higher layer, the coverage range of each network device may be divided into one or more cells, and the serving cell may be regarded as being composed of certain time-frequency domain resources. For the sake of simplicity of description, the following embodiments are described using an example where the coverage area of one network device is defined as one cell, and those having ordinary skills in the art can apply the method for implementing cooperative communication based on MTRP of the present disclosure to cases where the coverage area of one network device is divided into a plurality of cells based on the principles in the following embodiments, and the details will not be repeated herein. It can be understood that the network device may be a network-side device in a communication system such as a base station or a TRP, which is not limited in the embodiments.

It should be noted that the UE may be any terminal that can communicate with a cell, such as a mobile phone, a tablet computer, a notebook computer, etc. It can be understood that the UE in the embodiments of the present disclosure should support MTRP, i.e., should be capable of implementing cooperative communication in a single-PDCCH MTRP mode and a multi-PDCCH MTRP mode, which will not be repeated below. In an embodiment of the present disclosure, the UE should be in an overlapping area of the primary cell and the coordination cell. As shown in FIG. 2, an overlapping area 230 is an area that can be covered by signals of both a primary cell 210 and a coordination cell 220. In the overlapping area 230, a UE 240 can simultaneously receive signals from the primary cell 210 and the coordination cell 220, and implement cooperative communication in a single-PDCCH MTRP mode or a multi-PDCCH MTRP mode with the primary cell 210 and the coordination cell 220. It should be noted that FIG. 2 is used for illustrating the location of the UE by way of example only, and is not intended to limit the technical schemes of the embodiments of the present disclosure.

The embodiments of the present disclosure will be further described in detail below in conjunction with the accompanying drawings.

FIG. 1 shows a method for implementing cooperative communication which is applied to a network device of a primary cell according to an embodiment of the present disclosure. As shown in FIG. 1, the primary cell is a home cell of a UE and the primary cell is communicably connected to a coordination cell. The method for implementing cooperative communication includes the following steps of S110, S120 and S130.

At S110, a transmission parameter between the primary cell and the coordination cell is determined, where the transmission parameter represents transmission performance between the primary cell and the coordination cell.

It should be noted that the primary cell may be determined in any commonly used manner. For example, the UE selects a cell with the strongest received signal strength as a home cell, and when the home cell determines that there is at least one cell available for MTRP cooperative communication within the signal receiving range of the UE, the home cell is determined as the primary cell, and subsequent operations are executed, which is not limited in this embodiment.

It should be noted that the coordination cell may be determined by the primary cell, and the specific number of coordination cells may be determined according to the number of cells performing MTRP cooperative communication. For example, when two cells are required to complete MTRP cooperative communication together, one primary cell and one coordination cell may be determined, as long as MTRP cooperative communication can be achieved, which is not limited in this embodiment.

It should be noted that the transmission parameter may be any parameter characterizing transmission performance, such as a transmission latency, which is not limited in this embodiment. It can be understood that the specific value of the transmission parameter may be measured by the primary cell. For example, when the transmission parameter is transmission latency, the primary cell may determine the transmission latency according to data sending and receiving status between the primary cell and the coordination cell. The specific measurement method may be adjusted according to the specific type of the transmission parameter, which is not limited in this embodiment.

At S120, a target cooperation mode is determined according to the transmission parameter, and is sent to the coordination cell.

It should be noted that in an example where the transmission parameter is transmission latency, for the single-PDCCH MTRP mode, a Physical Downlink Shared Channel (PDSCH) scheduled by a PDCCH may need to be sent through two TRPs, and the two TRPs may need to interact with each other to determine layers to which data sent by the two TRPs respectively belongs, so that different layers of the PDSCH are sent to the UE through the primary cell and the coordination cell in this embodiment. In this case, the transmission latency between the primary cell and the coordination cell satisfies a certain condition, so that the transmission latency between the two cells does not affect the MTRP cooperative communication in the cooperative process, thereby making full use of MTRP to achieve a gain for the UE. When the transmission latency between the primary cell and the coordination cell is large, it means that the time of cooperation between the two cells is too long, affecting the communication effect, and failing to make full use of MTRP. In this case, the use of the multi-PDCCH MTRP mode for cooperative communication can achieve a better effect. Based on this, in this embodiment, by determining the target cooperation mode according to the transmission parameter, a more appropriate cooperation mode can be determined according to the transmission performance between the two cells, thereby making full use of cell resources.

It should be noted that the primary cell may inform the coordination cell of the target cooperation mode by signaling interaction or other means, which is not limited in this embodiment.

At S130, communication is performed with the UE through cooperation with the coordination cell according to the target cooperation mode.

It should be noted that MTRP cooperative communication may be implemented in either of the single-PDCCH MTRP mode and the multi-PDCCH MTRP mode. For example, when the single-PDCCH MTRP mode is used as the target cooperation mode, the primary cell sends one PDCCH, and the primary cell and the coordination cell respectively send data of different layers in a PDSCH to the UE, so that the UE can obtain a gain achieved by MTRP. For example, when the multi-PDCCH MTRP mode is used as the target cooperation mode, the primary cell and the coordination cell each send one PDCCH to the UE, and each of the two PDCCHs schedules one PDSCH, so that the UE can obtain a gain achieved by MTRP. It should be noted that the specific principles of transmission and parsing of PDCCHs and PDSCHs are not improvements made in this embodiment, and therefore will not be described in detail herein.

In addition, referring to FIG. 3, in an embodiment, before S110 in the embodiment shown in FIG. 1 is executed, the method further includes, but not limited to, the following steps of S310, S320 and S330.

At S310, a candidate cell is determined.

At S320, a first signal power and a second signal power of the UE are acquired, where the first signal power is a power used by the UE to receive a signal of the primary cell, and the second signal power is a power used by the UE to receive a signal of the candidate cell.

At S330, the candidate cell is determined as the coordination cell when the first signal power and the second signal power satisfy a first condition.

It should be noted that the UE may be in coverage ranges of multiple cells, and it is specified in a relevant protocol that MTRP cooperative transmission is generally implemented by two TRPs. In this embodiment, MTRP cooperative transmission is implemented by the primary cell and the coordination cell. Because the primary cell of the UE is known, the coordination cell for MTRP cooperative transmission may be determined by the primary cell before determining the target cooperation mode. It can be understood that when only one coordination cell may need to be determined, available cells are determined first; a cell with the strongest signal strength received by the UE is selected as a candidate cell from the available cells; when the candidate cell satisfies the first condition, the candidate cell is determined as the coordination cell; otherwise, another available cell is selected as a candidate cell and it is determined whether the another available cell satisfies the first condition. This process is repeated until a coordination cell satisfying the first condition is selected. Of course, all the available cells may be subjected to a determination as to whether the available cells satisfy the first condition, and one of the available cells satisfying the first condition is selected as a coordination cell. The specific method may be selected according to an actual requirement.

It should be noted that the first condition may be selected according to an actual requirement. For example, the first signal power and the second signal power are both within a preset power value range or greater than a preset power threshold. It can be understood by those having ordinary skills in the art that for MTRP cooperative communication, if there is a large signal strength difference between the two TRPs, the MTRP cooperative communication cannot increase the throughput of the UE, and may even cause a negative gain. Therefore, the first condition may also be a preset power difference threshold. After acquiring the first signal power and the second signal power reported by the UE, the primary cell calculates a power value difference between the first signal power and the second signal power. When an absolute value of the power value difference is less than the power difference threshold, it can be determined that the signal strength difference between the primary cell and the candidate cell satisfies a positive gain requirement of MTRP cooperative communication. The specific value of the power difference threshold may be adjusted as required.

Figure 4:
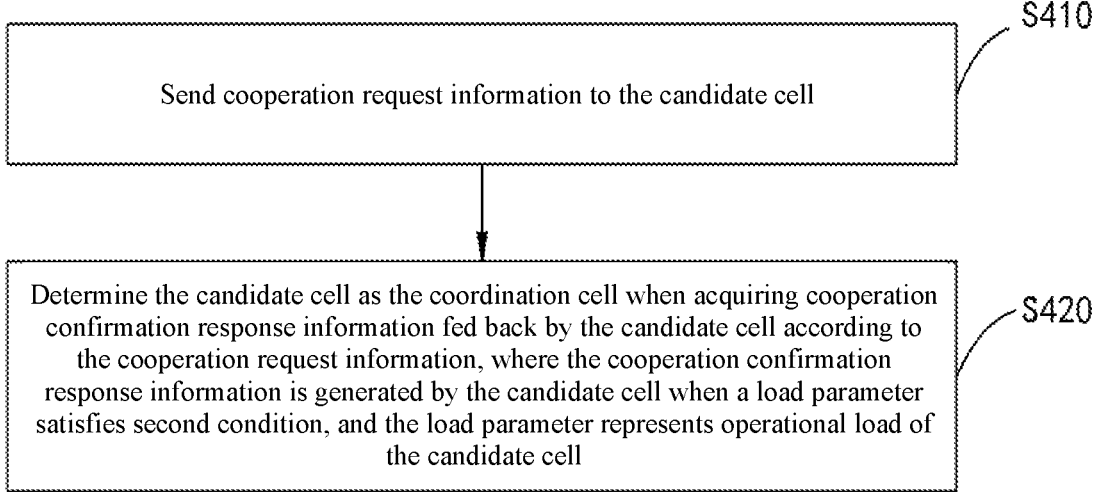
FIG. 4 is a flowchart of determining a coordination cell according to cooperation confirmation response information according to another embodiment of the present disclosure.

In addition, referring to FIG. 4, in an embodiment, S310 in the embodiment shown in FIG. 3 further includes, but not limited to, the following steps of S410 and S420.

At S410, cooperation request information is sent to the candidate cell.

At S420, the candidate cell is determined as the coordination cell when acquiring cooperation confirmation response information fed back by the candidate cell according to the cooperation request information, where the cooperation confirmation response information is generated by the candidate cell when a load parameter satisfies a second condition, and the load parameter represents operational load of the candidate cell.

It should be noted that the cooperation confirmation response information may be any information type, such as commonly used acknowledgement information, which is not limited in this embodiment. It can be understood that in the foregoing embodiments, the determination of the coordination cell is based on the first signal power, the second signal power, and the first condition. The first condition represents a value relationship between the first signal power and the second signal power. However, resources of the coordination cell are limited. Therefore, after the coordination cell is determined, it may further be determined whether the coordination cell has sufficient resources to assist the primary cell in implementing MTRP cooperative communication, so as to avoid the use of a coordination cell with insufficient resources to affect the effect of MTRP cooperative communication.

It can be understood that, whether the coordination cell has sufficient resources for MTRP cooperative communication may be determined by utilizing a Resource Block (RB) usage rate of the candidate cell in a period of time as the load parameter. If the RB usage rate in this period is less than or equal to a preset threshold, it indicates that the candidate cell has sufficient resources for MTRP cooperative communication together with the primary cell. The period during which the RB usage rate is acquired may be adjusted according to an actual requirement. Of course, the second condition and the load parameter may also be determined in other manners, for example, according to software and hardware running parameters of a network device in the coordination cell, which is not limited in this embodiment.

It can be understood that when the operational load of the candidate cell does not satisfy the second condition, it indicates that the candidate cell cannot well implement MTRP cooperative communication together with the primary cell. In this case, another candidate cell may be selected, and it should be ensured that the selected coordination cell has sufficient resources for MTRP cooperative communication.

Figure 5:
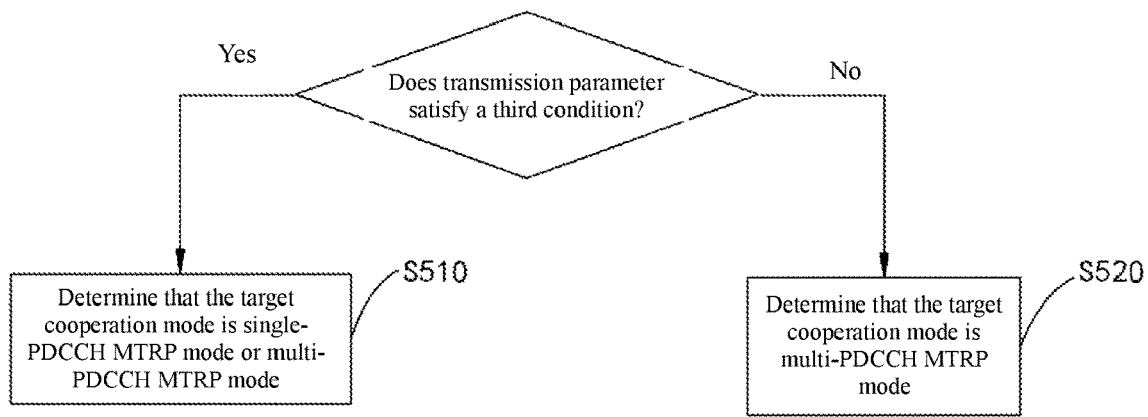
FIG. 5 is a flowchart of determining a target cooperation mode according to another embodiment of the present disclosure.

In addition, referring to FIG. 5, in an embodiment, S120 in the embodiment shown in FIG. 1 further includes, but not limited to, a following step of S510 or S520.

At S510, it is determined that the target cooperation mode is a single-PDCCH MTRP mode or a multi-PDCCH MTRP mode when the transmission parameter satisfies a third condition.

At S520, it is determined that the target cooperation mode is the multi-PDCCH MTRP mode when the transmission parameter does not satisfy the third condition.

It should be noted that, based on the embodiment shown in FIG. 1, the transmission parameter may be the transmission latency, and in this case, the third condition may be based on a value of the transmission latency. For example, when the transmission latency is less than a slot length, the transmission latency can be ignored, and the throughput of the UE can be increased by utilizing either the single-PDCCH MTRP mode or the multi-PDCCH MTRP mode; otherwise, the transmission latency between cells cannot be ignored, and sending different PDCCHs through the two cells respectively using the multi-PDCCH MTRP mode can achieve a better cooperative effect. The specific type of the third condition may be selected according to an actual requirement, as long as the third condition being satisfied can be used to represent that the transmission performance can realize the single-PDCCH MTRP mode.

It should be noted that the transmission latency may be determined by measurement or may be determined directly according to a base station type. Different arrangement modes of base stations have certain impact on the transmission latency. There is a large transmission latency among distributed base stations, and a small transmission latency among stacked base stations. Because the base station type is known to the primary cell and the coordination cell, it can be determined that the transmission latency does not satisfy the third condition when at least one of the primary cell and the coordination cell is a distributed base station, and it can be determined that the transmission latency satisfies the third condition when neither the primary cell nor the coordination cell is a distributed base station. In this way, the relationship between the transmission parameter and the third condition can be quickly determined.

Figure 6:
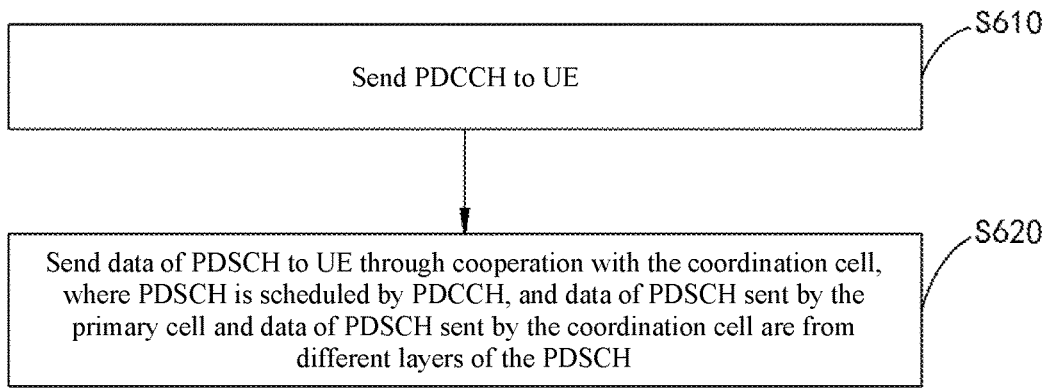
FIG. 6 is a flowchart of communication in a single-PDCCH MTRP mode according to another embodiment of the present disclosure.

In addition, referring to FIG. 6, in an embodiment, when the target cooperation mode is the single-PDCCH MTRP mode, S130 in the embodiment shown in FIG. 1 further includes, but not limited to, the following steps of S610 and S620.

At S610, a PDCCH is sent to the UE.

At S620, data of a PDSCH is sent to the UE through cooperation with the coordination cell, where the PDSCH is scheduled by the PDCCH, and the data of the PDSCH sent by the primary cell and the data of the PDSCH sent by the coordination cell are from different layers of the PDSCH.

It should be noted that for the single-PDCCH MTRP mode, the base station side may only need to transmit one PDCCH. Therefore, the PDCCH may be sent through the primary cell serving as a decision side, and data of different layers of the PDSCH scheduled by the PDCCH may be transmitted through two TRPs (which are the primary cell and the coordination cell in this embodiment), so that the UE can obtain a gain of increased throughput through the multi-point cooperative transmission. It can be understood that after sending the PDCCH to the UE, the primary cell may inform the coordination cell through any type of notification information, so that the coordination cell jointly sends the PDSCH together with the primary cell.

It can be understood that the PDSCH includes several layers of data, and each layer includes different data. Based on MTRP, data of different layers may be sent through the primary cell and the coordination cell, respectively. The specific correspondence between the cells and the layers is not an improvement made in this embodiment and will not be detailed herein, as long as MTRP cooperative communication can be realized.

Figure 7:
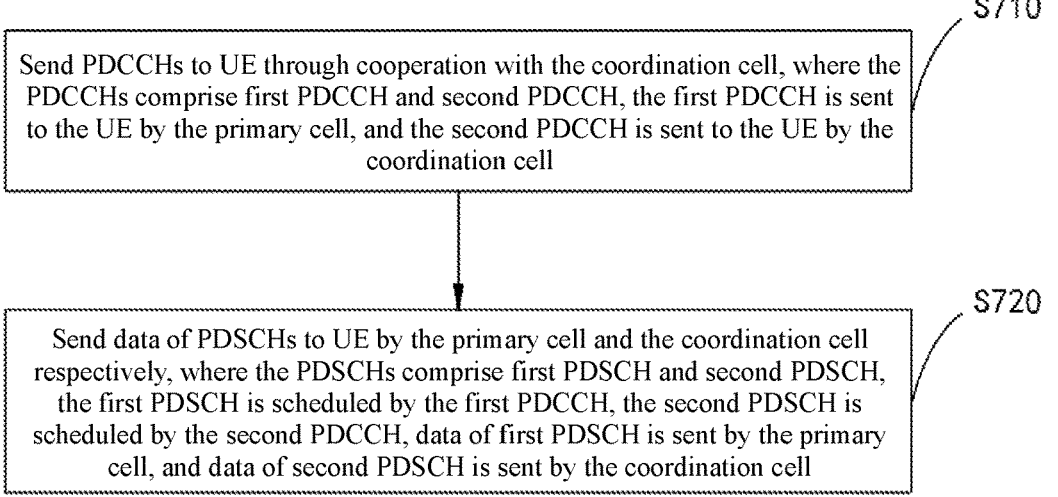
FIG. 7 is a flowchart of communication in a multi-PDCCH MTRP mode according to another embodiment of the present disclosure.

In addition, referring to FIG. 7, in an embodiment, when the target cooperation mode is the multi-PDCCH MTRP mode, S130 in the embodiment shown in FIG. 1 further includes, but not limited to, the following steps of S710 and S720.

At S710, PDCCHs are sent to the UE through cooperation with the coordination cell, where the PDCCHs include a first PDCCH and a second PDCCH, the first PDCCH is sent to the UE by the primary cell, and the second PDCCH is sent to the UE by the coordination cell.

At S720, data of PDSCHs is sent to the UE by the primary cell and the coordination cell respectively, where the PDSCHs include a first PDSCH and a second PDSCH, the first PDSCH is scheduled by the first PDCCH, the second PDSCH is scheduled by the second PDCCH, data of the first PDSCH is sent by the primary cell, and data of the second PDSCH is sent by the coordination cell.

It should be noted that the first PDCCH and the second PDCCH may be sent to the UE simultaneously to make full use of the scheduling advantage of MTRP cooperative communication. After receiving the two PDCCHs, the UE receives corresponding PDSCHs, thereby obtaining a throughput gain brought by multi-point cooperation. It should be noted that this embodiment does not involve any improvement on the PDCCH distribution mode and the PDSCH scheduling mode in the multi-PDCCH MTRP mode, so the details will not be described herein.

In addition, referring to FIG. 8, in an embodiment, after S720 in the embodiment shown in FIG. 7 is executed, the method further includes a following step of S800.

At S800, HARQs fed back by the UE is acquired through cooperation with the coordination cell, where the HARQs include a first HARQ and a second HARQ, the first HARQ corresponds to the first PDSCH, and the second HARQ corresponds to the second PDSCH. S800 further includes, but not limited to, a following step of S810, S820, or S830.

At S810, the first HARQ and the second HARQ sent by the UE in a joint feedback mode are acquired through cooperation with the coordination cell when the transmission parameter satisfies the third condition.

At S820, the first HARQ and the second HARQ sent by the UE in a separate feedback mode are acquired through cooperation with the coordination cell when the transmission parameter satisfies the third condition.

At S830, the first HARQ and the second HARQ sent by the UE in a separate feedback mode are acquired through cooperation with the coordination cell when the transmission parameter does not satisfy the third condition.

It should be noted that this embodiment does not involve any improvement on the specific HARQ feedback procedure and the response mode to the feedback, but only involves a determination of the joint feedback or separate feedback mode, which will not be repeated below.

It should be noted that when the transmission parameter satisfies the third condition, the transmission latency between the primary cell and the coordination cell is small, and information can be quickly exchanged between the cells. Therefore, the first HARQ and the second HARQ sent in the joint feedback mode in S810 may be adopted. To be specific, the UE generates a HARQ according to the first PDSCH and the second PDSCH and feeds back the HARQ to the primary cell to complete HARQ feedback. Alternatively, the separate feedback mode in S820 may be adopted. To be specific, the UE separately feeds back the first HARQ and the second HARQ to complete HARQ feedback. Recipients of the HARQs may be determined according to an actual requirement. Whether to adopt the mode in S810 or the mode in S820 may be selected according to an actual requirement.

It should be noted that the HARQ feedback mode in this embodiment is applied to an application scenario of the multi-PDCCH MTRP mode. For an application scenario of the single-PDCCH MTRP mode, the HARQ of the UE may only need to be fed back to the primary cell, and the feedback of multiple HARQs is not involved, so the details will not be repeated herein.

Based on the above descriptions, when the transmission parameter does not meet the third condition, the transmission latency between the primary cell and the coordination cell is large, and in this case, the use of the separate feedback mode for HARQ feedback can prevent the cooperative communication from being affected by the transmission latency between the primary cell and the coordination cell, so as to ensure that the throughput of the UE can be effectively increased.

In addition, referring to FIG. 9, in an embodiment, a method for implementing cooperative communication is further provided, which is applied to a network device of a coordination cell. The coordination cell is a coordination cell of a primary cell in which a UE is homed. The method includes, but not limited to, the following steps of S910 and S920.

At S910, a target cooperation mode sent by the primary cell is received, where the target cooperation mode is determined by the primary cell according to a transmission parameter between the primary cell and the coordination cell, and the transmission parameter represents transmission performance between the primary cell and the coordination cell.

At S920, communication is performed with the UE through cooperation with the primary cell according to the target cooperation mode.

It should be noted that the coordination cell in this embodiment is a coordination cell that has been determined by the primary cell, and for a specific determination method, reference may be made to the methods of the embodiments shown in FIG. 1 and FIG. 3. The main difference between this embodiment and the embodiments shown in FIG. 1 and FIG. 3 lies in that the execution entity of this embodiment is a network device of the coordination cell. The network device interacts with a network device of the primary cell to implement the method including S910 and S920, which will not be repeated herein.

It can be understood that for the specific method and principle of S920, reference may be made to the embodiment shown in FIG. 1, and the details will not be repeated in this embodiment.

In addition, referring to FIG. 10, in an embodiment, before S910 in the embodiment shown in FIG. 9 is executed, the method further includes, but not limited to, the following steps of S1010 and S1020.

At S1010, a load parameter is determined when receiving a cooperation request information sent by the primary cell.

At S1020, cooperation confirmation response information is fed back to the primary cell when the load parameter satisfies a second condition, so that the primary cell determines the coordination cell according to the cooperation confirmation response information.

It should be noted that in order to ensure that the coordination cell has sufficient resources for MTRP cooperative communication, after the cooperation request information sent by the primary cell is received, an RB usage rate of the candidate cell in a period of time may be used as the load parameter. In addition, the second condition may be a preset threshold. When the acquired RB usage rate is less than or equal to the preset threshold, it indicates that the candidate cell has sufficient resources to implement MTRP cooperative communication together with the primary cell. The period during which the RB usage rate is acquired may be adjusted according to an actual requirement. Of course, the second condition and the load parameter may also be determined in other manners, for example, according to software and hardware running parameters of a network device in the coordination cell, which is not limited in this embodiment.

In addition, referring to FIG. 1, in an embodiment, when the target cooperation mode is the single-PDCCH MTRP mode, S920 in the embodiment shown in FIG. 9 further includes, but not limited to, a following step of S1110.

At S1110, data of a PDSCH is sent to the UE through cooperation with the primary cell in a case that the primary cell sends a PDCCH to the UE, where the PDSCH is scheduled by the PDCCH, and the data of the PDSCH sent by the primary cell and the data of the PDSCH sent by the coordination cell are from different layers of the PDSCH.

It should be noted that for the principle and method of this embodiment, reference may be made to the principle and method of the embodiment shown in FIG. 6. The main difference between this embodiment and the embodiment shown in FIG. 6 lies in that this embodiment is applied to a network device of the coordination cell. After the primary cell sends the PDCCH to the UE, the coordination cell and the primary cell cooperate to send the data of the PDSCH.

In addition, referring to FIG. 12, in an embodiment, when the target cooperation mode is the multi-PDCCH MTRP mode, S920 in the embodiment shown in FIG. 9 further includes, but not limited to, the following steps of S1210 and S1220.

At S1210, PDCCHs are sent to the UE through cooperation with the primary cell, where the PDCCHs include a first PDCCH and a second PDCCH, the first PDCCH is sent to the UE by the primary cell, and the second PDCCH is sent to the UE by the coordination cell.

At S1220, data of PDSCHs is sent to the UE by the primary cell and the coordination cell respectively, where the PDSCHs include a first PDSCH and a second PDSCH, the first PDSCH is scheduled by the first PDCCH, the second PDSCH is scheduled by the second PDCCH, data of the first PDSCH is sent by the primary cell, and data of the second PDSCH is sent by the coordination cell.

It should be noted that for the specific principle of the multi-PDCCH MTRP mode in this embodiment, reference may be made to the principle of the embodiment shown in FIG. 7. The main difference between this embodiment and the embodiment shown in FIG. 7 lies in that the execution entity of this embodiment is a network device of the coordination cell. The network device is configured to send the second PDCCH to the UE in response to the cooperation request from the primary cell, and send the data in the second PDSCH scheduled by the second PDCCH to the UE. The same principle will not be repeated herein.

In addition, referring to FIG. 13, in an embodiment, after S1220 in the embodiment shown in FIG. 11 is executed, the method further includes: acquiring, through cooperation with the primary cell, HARQs fed back by the UE, where the HARQs include a first HARQ and a second HARQ, the first HARQ corresponds to the first PDSCH, and the second HARQ corresponds to the second PDSCH. Acquiring, through cooperation with the primary cell, HARQs fed back by the UE includes a following step of S1310, S1320, or S1330.

At S1310, the first HARQ and the second HARQ sent by the UE in a joint feedback mode are acquired through cooperation with the primary cell when the transmission parameter satisfies the third condition.

At S1320, the first HARQ and the second HARQ sent by the UE in a separate feedback mode are acquired through cooperation with the primary cell when the transmission parameter satisfies the third condition.

At S1330, the first HARQ and the second HARQ sent by the UE in a separate feedback mode are acquired through cooperation with the primary cell when the transmission parameter does not satisfy the third condition.

It should be noted that for the specific principle of HARQ feedback in this embodiment, reference may be made to the principle of the embodiment shown in FIG. 8. The main difference between this embodiment and the embodiment shown in FIG. 8 lies in that the execution entity of this embodiment is a network device of the coordination cell.

The network device is configured to send the second PDCCH to the UE in response to the cooperation request from the primary cell, and send the data in the second PDSCH scheduled by the second PDCCH to the UE. The same principle will not be repeated herein.

In addition, in some embodiments, to better illustrate the method for implementing cooperative communication in this embodiment, the technical scheme of this embodiment will be described below through five examples in conjunction with FIG. 14 to FIG. 16.

It should be noted that in all examples of this embodiment, two cells are included, which are denoted as Cell 1 and Cell 2 for convenience of distinguishing, where Cell 1 has been determined as a primary cell of a UE, and the UE is in an overlapping area of Cell 1 and Cell 2.

In addition, it should be noted that this embodiment is described using an example where the first condition is the absolute value of the power difference being less than or equal to 6 dB, the load parameter is the RB usage rate, the second condition is an RB threshold, and the transmission parameter is the transmission latency. When the transmission latency satisfies the third condition, the transmission latency is an ideal latency. When the transmission latency does not satisfy the third condition, the transmission latency is a non-ideal latency. "Ideal" means that the transmission latency does not affect the cooperative transmission between cells, and "non-ideal" means that the transmission latency affects the cooperative transmission between cells. The selection of the above technical features is only for convenience of description, and is not intended to limit the protection scope of this embodiment.

Example one: Referring to FIG. 14, in a single-PDCCH MTRP scenario with an ideal latency, the method includes the following steps of S1411, S1412, S1420, S1430, S1440, S1450 and S1460.

At S1411, the UE reports a first signal power and a second signal power to Cell 1, where the first signal power is a power used by the UE to receive a signal of Cell 1, and the second signal power is a power used by the UE to receive a signal of Cell 2.

At S1412, Cell 1 determines that an absolute value of a difference between the first signal power and the second signal power is less than or equal to 6 dB, and determines that Cell 2 is a coordination cell and the UE is a UE requiring MTRP cooperative communication.

At S1420, Cell 2 determines that an RB usage rate is less than or equal to an RB threshold and that software and hardware running load of Cell 2 meets a requirement of cooperative communication, and determines to perform cooperative communication with Cell 1.

At S1430, Cell 1 determines that a transmission latency between Cell 1 and Cell 2 is an ideal transmission latency, and determines to use the single-PDCCH MTRP mode between Cell 1 and Cell 2.

At S1440, Cell 1 sends a PDCCH to the UE.

At S1450, Cell 1 and Cell 2 send different data layers of a PDSCH to the UE, respectively.

At S1460, the UE feeds back a HARQ to Cell 1.

Example Two: Referring to FIG. 15, in a multi-PDCCH MTRP scenario with an ideal latency and using the separate HARQ feedback mode, the method includes the following steps of S1511, S1512, S1520, S1530, 1541, S1542, S1551, S1552 and S1560.

At S1511, the UE reports a first signal power and a second signal power to Cell 1, where the first signal power is a power used by the UE to receive a signal of Cell 1, and the second signal power is a power used by the UE to receive a signal of Cell 2.

At S1512, Cell 1 determines that an absolute value of a difference between the first signal power and the second signal power is less than or equal to 6 dB, and determines that Cell 2 is a coordination cell and the UE is a UE requiring MTRP cooperative communication.

At S1520, Cell 2 determines that an RB usage rate is less than or equal to an RB threshold and that software and hardware running load of Cell 2 meets a requirement of cooperative communication, and determines to perform cooperative communication with Cell 1.

At S1530, Cell 1 determines that a transmission latency between Cell 1 and Cell 2 is an ideal transmission latency, and determines to use the multi-PDCCH MTRP mode between Cell 1 and Cell 2.

At S1541, Cell 1 sends a first PDCCH to the UE.

At S1542, Cell 2 sends a second PDCCH to the UE.

At S1551, Cell 1 sends a first PDSCH to the UE.

At S1552, Cell 2 sends a second PDSCH to the UE.

At S1560, the UE sends a first HARQ and a second HARQ in a separate feedback mode.

It should be noted that S1541 and S1542 may be executed simultaneously, and S1551 and S1552 may be executed simultaneously.

Example Three: In a multi-PDCCH MTRP scenario with an ideal latency and using the joint HARQ feedback mode, the method includes the steps S1511 to S1552 shown in FIG. 15. The difference between this example and Example Two lies in that in this example, after S1552 is executed, the UE generates a HARQ according to the first PDSCH and the second PDSCH and sends the HARQ to Cell 1 in a joint feedback mode.

Example Four: Referring to FIG. 16, in a multi-PDCCH MTRP scenario with a non-ideal latency and using the separate HARQ feedback mode, the method includes the following steps of S1611, S1612, S1620, S1630, S1641, S1642, S1651, S1652 and S1660.

At S1611, the UE reports a first signal power and a second signal power to Cell 1, where the first signal power is a power used by the UE to receive a signal of Cell 1, and the second signal power is a power used by the UE to receive a signal of Cell 2.

At S1612, Cell 1 determines that an absolute value of a difference between the first signal power and the second signal power is less than or equal to 6 dB, and determines that Cell 2 is a coordination cell and the UE is a UE requiring MTRP cooperative communication.

At S1620, Cell 2 determines that an RB usage rate is less than or equal to an RB threshold and that software and hardware running load of Cell 2 meets a requirement of cooperative communication, and determines to perform cooperative communication with Cell 1.

At S1630, Cell 1 determines that a transmission latency between Cell 1 and Cell 2 is a non-ideal transmission latency, and determines to use the multi-PDCCH MTRP mode between Cell 1 and Cell 2.

At S1641, Cell 1 sends a first PDCCH to the UE.

At S1642, Cell 2 sends a second PDCCH to the UE.

At S1651, Cell 1 sends a first PDSCH to the UE.

At S1652, Cell 2 sends a second PDSCH to the UE.

At S1660, the UE sends a first HARQ and a second HARQ in a separate feedback mode.

It should be noted that S1641 and S1642 may be executed simultaneously, S1651 and S1652 may be executed simultaneously, and S1661 and S1662 may be executed simultaneously.

Example Five: Referring to FIG. 17, a scenario where Cell 2 does not have a sufficient load headroom, the method includes the following steps of S1711, S1712 and S1720.

At S1711, the UE reports a first signal power and a second signal power to Cell 1, where the first signal power is a power used by the UE to receive a signal of Cell 1, and the second signal power is a power used by the UE to receive a signal of Cell 2.

At S1712, Cell 1 determines that an absolute value of a difference between the first signal power and the second signal power is less than or equal to 6 dB, and determines that Cell 2 is a coordination cell and the UE is a UE requiring MTRP cooperative communication.

At S1720, Cell 2 determines that an RB usage rate is greater than an RB threshold, determines that Cell 2 does not have a sufficient load headroom for cooperative communication, and instructs Cell 1 to re-select a coordination cell.

By the technical schemes in the foregoing five examples, the coordination cell can decide, based on its load status, whether to perform cooperative communication for the UE served by the primary cell, and the primary cell can measure the transmission latency between the primary cell and the coordination cell and decide whether to use the single-PDCCH MTRP mode or the multi-PDCCH MTRP mode for cooperative communication for the UE. In this way, the utilization of resources between cells can be maximized, and an effective cooperation mode can be used in both a case with an ideal latency between cells and a case with a non-ideal latency between cells, thereby increasing the throughput of the UE and the network throughput.

Figure 18:
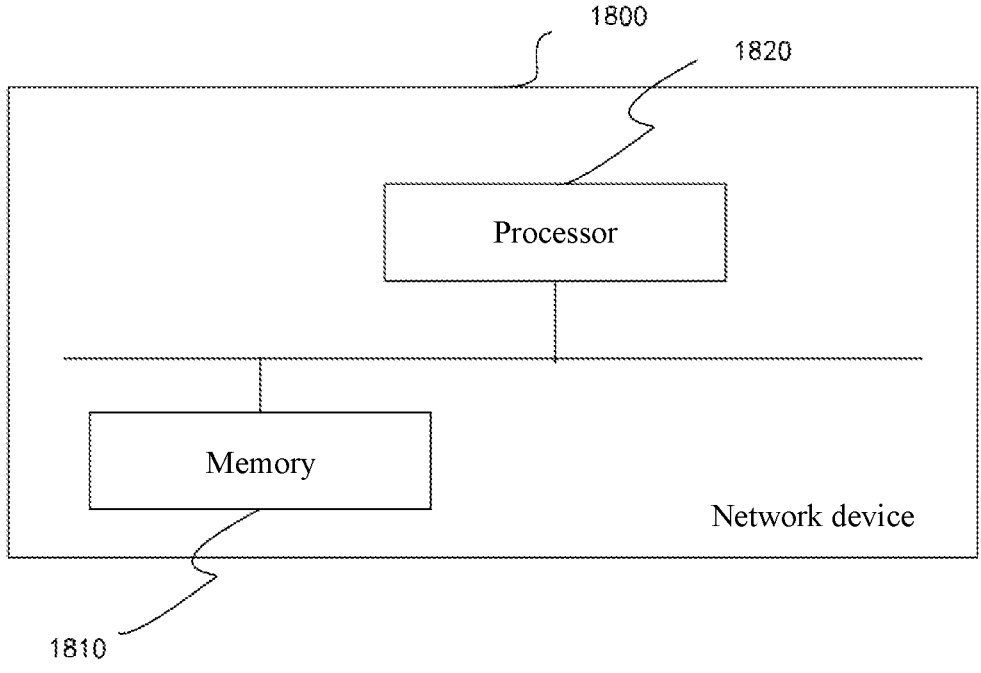
FIG. 18 is a schematic block diagram of a network device according to another embodiment of the present disclosure.

In addition, referring to FIG. 18, an embodiment of the present disclosure further provides a network device 1800, including a memory 1810, a processor 1820, and a computer program stored in the memory 1810 and executable by the processor 1820.

The processor 1820 and the memory 1810 may be connected by a bus or in other ways.

Figure 14:
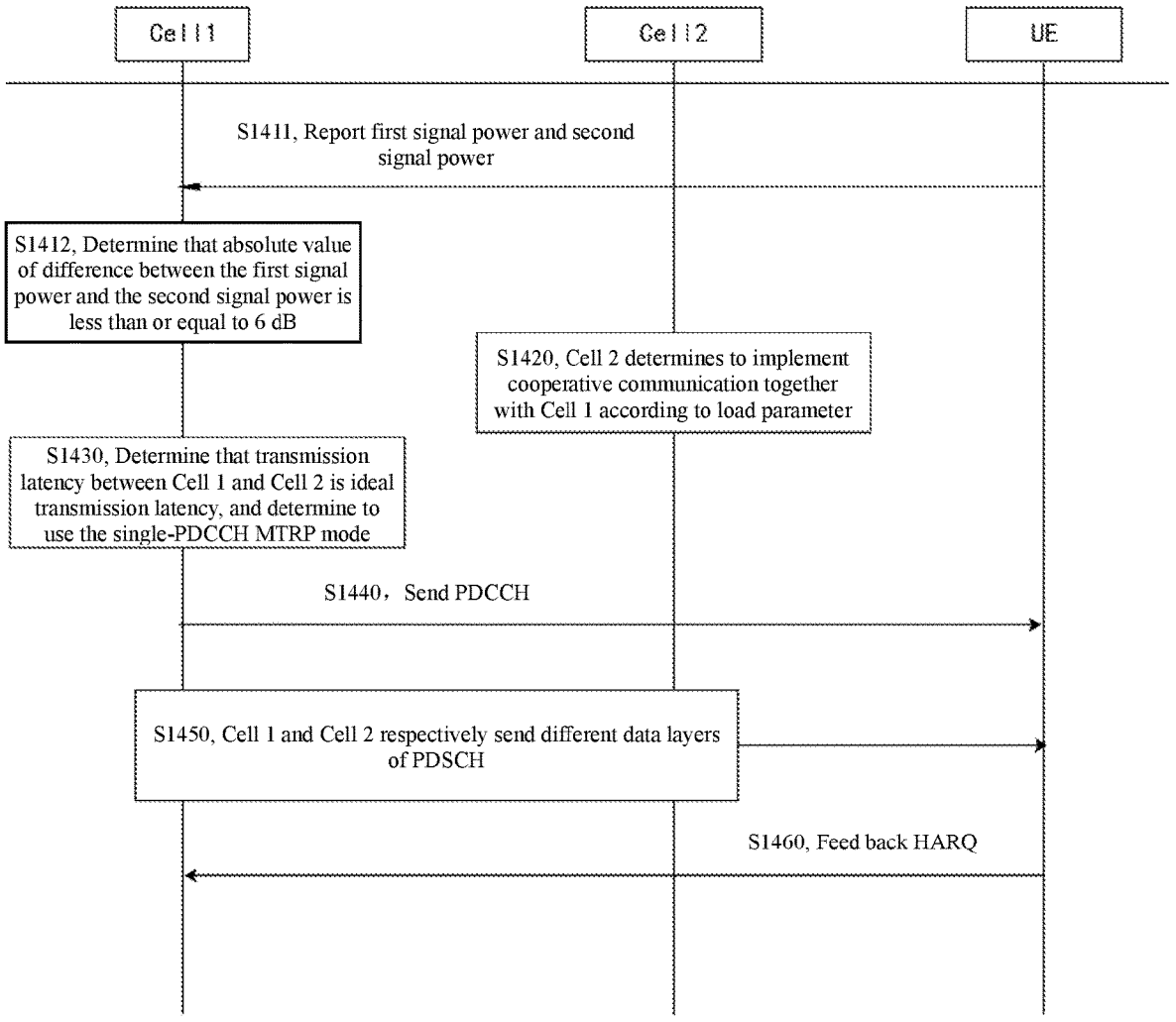
FIG. 14 is an example flowchart of a method for implementing cooperative communication according to another embodiment of the present disclosure.
Figure 15:
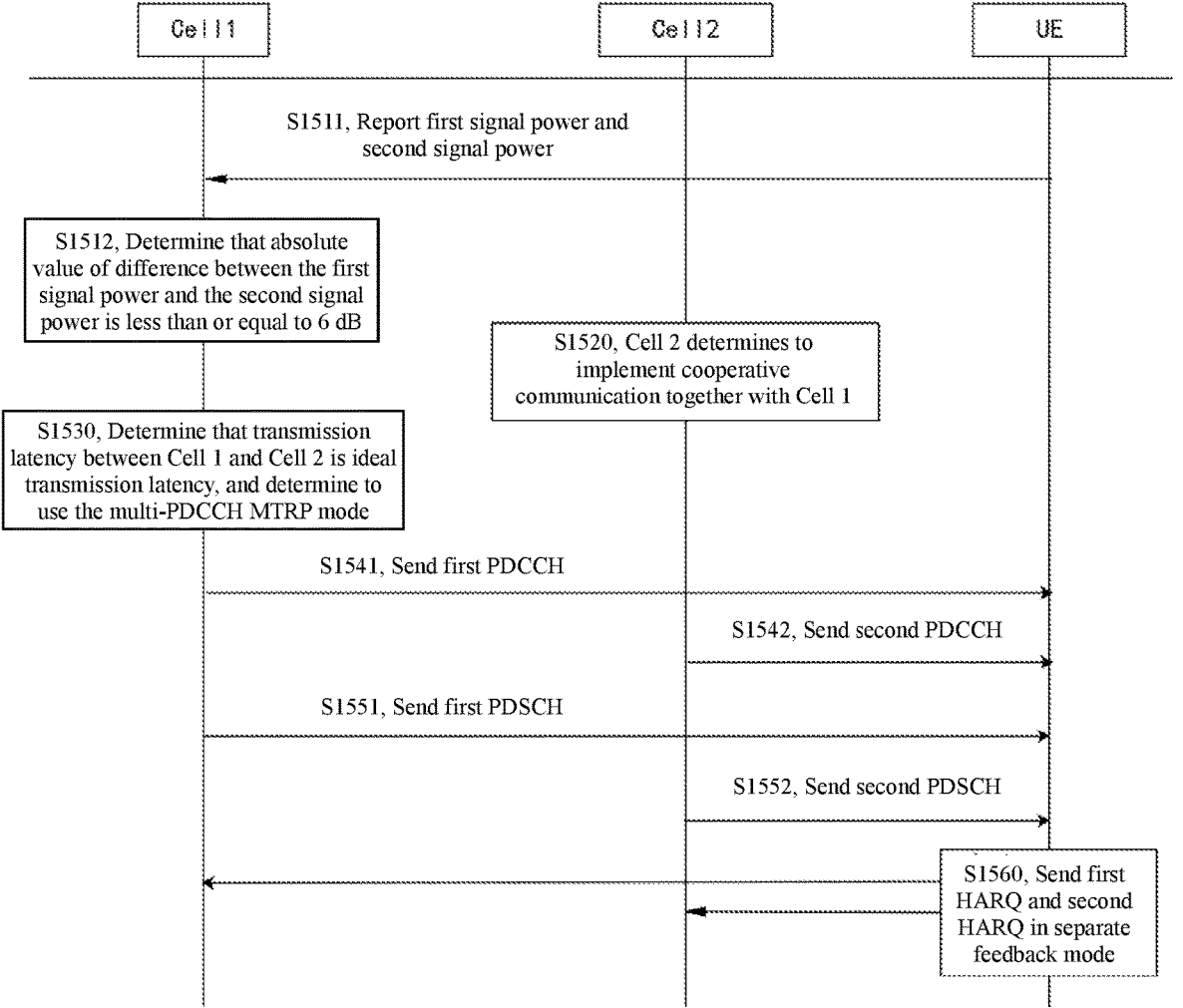
FIG. 15 is an example flowchart of a method for implementing cooperative communication according to another embodiment of the present disclosure.

The non-transitory software program and instructions required to implement the method for implementing cooperative communication in the foregoing embodiments are stored in the memory 1810 which, when executed by the processor 1820, cause the processor 1820 to implement method for implementing cooperative communication applied to a network device of a primary cell in the foregoing embodiments, for example, implement the method steps S110 to S130 in FIG. 1, the method steps S310 to S330 in FIG. 3, the method steps S410 to S420 in FIG. 4, the method steps S510 to S520 in FIG. 5, the method steps S610 to S620 in FIG. 6, the method steps S710 to S720 in FIG. 7, or the method steps S800 to S830 in FIG. 8; or implement the method for implementing cooperative communication applied to a network device of a coordination cell in the foregoing embodiments, for example, implement the method steps S910 to S920 in FIG. 9, the method steps S1010 to S1020 in FIG. 10, the method step S1110 in FIG. 11, the method steps S1210 to S1220 in FIG. 12, or the method steps S1300 to S1330 in FIG. 13, or implement the method steps S1411 to S1460 in FIG. 14, the method steps S1511 to S1560 in FIG. 15, the method steps S1611 to S1660 in FIG. 16, or the method steps S1711 to S1720 in FIG. 17.

The apparatus embodiments described above are merely examples. The units described as separate components may or may not be physically separated, i.e., may be located in one place or may be distributed over a plurality of network units. Some or all of the modules may be selected according to actual needs to achieve the objects of the scheme of this embodiment.

In addition, an embodiment of the present disclosure further provides a computer-readable storage medium, storing a computer-executable instruction which, when executed by a processor or controller, for example, by a processor in the network device embodiment described above, causes the processor to implement the method for implementing cooperative communication applied to a network device of a primary cell in the foregoing embodiments, for example, implement the method steps S110 to S130 in FIG. 1, the method steps S310 to S330 in FIG. 3, the method steps S410 to S420 in FIG. 4, the method steps S510 to S520 in FIG. 5, the method steps S610 to S620 in FIG. 6, the method steps S710 to S720 in FIG. 7, or the method steps S800 to S830 in FIG. 8; or implement the method for implementing cooperative communication applied to a network device of a coordination cell in the foregoing embodiments, for example, implement the method steps S910 to S920 in FIG. 9, the method steps S1010 to S1020 in FIG. 10, the method step S1110 in FIG. 11, the method steps S1210 to S1220 in FIG. 12, or the method steps S1300 to S1330 in FIG. 13, or implement the method steps S1411 to S1460 in FIG. 14, the method steps S1511 to S1560 in FIG. 15, the method steps S1611 to S1660 in FIG. 16, or the method steps S1711 to S1720 in FIG. 17.

An embodiment of the present disclosure includes: determining a coordination cell of the UE; determining a transmission parameter between the primary cell and the coordination cell, where the transmission parameter represents transmission performance between the primary cell and the coordination cell; determining a target cooperation mode according to the transmission parameter, and sending the target cooperation mode to the coordination cell; and performing communication with the UE through cooperation with the coordination cell according to the target cooperation mode. According to the scheme provided by the embodiments of the present disclosure, a cooperation mode for a UE can be determined, to maximize the utilization of cell resources and increase the throughput of the UE.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a Central Processing Unit, a Digital Signal Processor, or a microprocessor, or as hardware, or as an integrated circuit, such as an Application-Specific Integrated Circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some implementations of the present disclosure have been described above, the present disclosure is not limited to the implementations described above. Those having ordinary skills in the art can make various equivalent modifications or replacements without departing from the scope of the present disclosure. Such equivalent modifications or replacements fall within the scope defined by the claims of the present disclosure.

What is claimed is:

1. A method for implementing cooperative communication, applied to a network device of a primary cell, wherein the primary cell is a home cell of a User Equipment (UE) and the primary cell is communicably connected to a coordination cell, the method for implementing cooperative communication comprising:

determining a candidate cell;

acquiring a first signal power and a second signal power of the UE, wherein the first signal power is a power used by the UE to receive a signal of the primary cell, and the second signal power is a power by the UE to receive a signal of the candidate cell; and determining the candidate cell as the coordination cell in response to the first signal power and the second signal power satisfying a first condition, comprising:

sending cooperation request information to the candidate cell; and determining the candidate cell as the coordination cell in response to acquiring cooperation confirmation response information fed back by the candidate cell according to the cooperation request information, wherein the cooperation confirmation response information is generated by the candidate cell in response to a load parameter satisfying a second condition, and the load parameter represents operational load of the candidate cell;

determining a transmission parameter between the primary cell and the coordination cell, wherein the transmission parameter represents transmission performance between the primary cell and the coordination cell;

determining a target cooperation mode according to the transmission parameter, and sending the target cooperation mode to the coordination cell; and performing communication with the UE through cooperation with the coordination cell according to the target cooperation mode.

2. The method of claim 1, wherein determining a target cooperation mode according to the transmission parameter comprises:

determining that the target cooperation mode is a single-Physical Downlink Control Channel (PDCCH) Multi Transmission/Reception Point (MTRP) mode or a multi-PDCCH MTRP mode, in response to the transmission parameter satisfying a third condition; or determining that the target cooperation mode is the multi-PDCCH MTRP mode in response to the transmission parameter not satisfying the third condition.

3. A network device, comprising: a memory, a processor, and a computer program stored in the memory and executable by the processor, wherein the computer program, when executed by the processor, causes the processor to perform the method for implementing cooperative communication of claim 1.

4. A non-transitory computer-readable storage medium, storing a computer-executable instruction which, when executed by a processor, causes the processor to perform the method for implementing cooperative communication of claim 1.

5. The method of claim 2, wherein in response to the target cooperation mode being the single-PDCCH MTRP mode, performing communication with the UE through cooperation with the coordination cell according to the target cooperation mode comprises:

sending a PDCCH to the UE; and sending data of a Physical Downlink Shared Channel (PDSCH) to the UE through cooperation with the coordination cell, wherein the PDSCH is scheduled by the PDCCH, and the data of the PDSCH sent by the primary cell and the data of the PDSCH sent by the coordination cell are from different layers of the PDSCH.

6. The method of claim 2, wherein in response to the target cooperation mode being the multi-PDCCH MTRP mode, performing communication with the UE in cooperation with the coordination cell according to the target cooperation mode comprises:

sending PDCCHs to the UE through cooperation with the coordination cell, wherein the PDCCHs comprise a first PDCCH and a second PDCCH, the first PDCCH is sent to the UE by the primary cell, and the second PDCCH is sent to the UE by the coordination cell; and sending data of PDSCHs to the UE by the primary cell and the coordination cell respectively, wherein the PDSCHs comprise a first PDSCH and a second PDSCH, the first PDSCH is scheduled by the first PDCCH, the second PDSCH is scheduled by the second PDCCH, data of the first PDSCH is sent by the primary cell, and data of the second PDSCH is sent by the coordination cell.

7. The method of claim 6, wherein after sending data of PDSCHs to the UE with the coordination cell respectively, the method further comprises:

acquiring Hybrid Automatic Retransmission Requests (HARQs) fed back by the UE through cooperation with the coordination cell, wherein the HARQs comprise a first HARQ and a second HARQ, the first HARQ corresponds to the first PDSCH, and the second HARQ corresponds to the second PDSCH; and acquiring HARQs fed back by the UE through cooperation with the coordination cell comprises:

acquiring, through cooperation with the coordination cell, the first HARQ and the second HARQ sent by the UE in a joint feedback mode, in response to the transmission parameter satisfying the third condition; or acquiring, through cooperation with the coordination cell, the first HARQ and the second HARQ sent by the UE in a separate feedback mode, in response to the transmission parameter satisfying the third condition; or acquiring, through cooperation with the coordination cell, the first HARQ and the second HARQ sent by the UE in a separate feedback mode, in response to the transmission parameter not satisfying the third condition.

8. A method for implementing cooperative communication, applied to a network device of a coordination cell, wherein the coordination cell is a coordination cell of a primary cell in which a User Equipment (UE) is homed, the method comprising:

determining a load parameter in response to receiving a cooperation request information sent by the primary cell; and feeding back cooperation confirmation response information to the primary cell in response to the load parameter satisfying a second condition, so that the primary cell determines the coordination cell according to the cooperation confirmation response information;

receiving a target cooperation mode sent by the primary cell, wherein the target cooperation mode is determined by the primary cell according to a transmission parameter between the primary cell and the coordination cell, and the transmission parameter represents transmission performance between the primary cell and the coordination cell; and performing communication with the UE through cooperation with the primary cell according to the target cooperation mode.

9. The method of claim 8, wherein the load parameter comprises at least one of:

a Resource Block (RB) usage rate in a preset time; or operational load of the device.

10. The method of claim 8, wherein in response to the target cooperation mode being a single-Physical Downlink Control Channel (PDCCH) Multi Transmission/Reception Point (MTRP) mode, performing communication with the UE through cooperation with the primary cell according to the target cooperation mode comprises:

sending data of a Physical Downlink Shared Channel (PDSCH) to the UE through cooperation with the primary cell in response to the primary cell sending the PDCCH to the UE, wherein the PDSCH is scheduled by the PDCCH, and the data of the PDSCH sent by the primary cell and the data of the PDSCH sent by the coordination cell are from different layers of the PDSCH.

11. The method of claim 8, wherein in response to the target cooperation mode being the multi-PDCCH MTRP mode, performing communication with the UE in cooperation with the primary cell according to the target cooperation mode comprises:

sending PDCCHs to the UE through cooperation with the primary cell, wherein the PDCCHs comprise a first PDCCH and a second PDCCH, the first PDCCH is sent to the UE by the primary cell, and the second PDCCH is sent to the UE by the coordination cell; and sending data of PDSCHs to the UE with the primary cell respectively, wherein the PDSCHs comprise a first PDSCH and a second PDSCH, the first PDSCH is scheduled by the first PDCCH, the second PDSCH is scheduled by the second PDCCH, data of the first PDSCH is sent by the primary cell, and data of the second PDSCH is sent by the coordination cell.

12. The method of claim 11, wherein after sending data of PDSCHs to the UE with the primary cell respectively, the method further comprises:

acquiring, through cooperation with the primary cell, Hybrid Automatic Retransmission Requests (HARQs) fed back by the UE, wherein the HARQs comprise a first HARQ and a second HARQ, the first HARQ corresponds to the first PDSCH, and the second HARQ corresponds to the second PDSCH; and acquiring, through cooperation with the primary cell, HARQs fed back by the UE comprises:

acquiring, through cooperation with the primary cell, the first HARQ and the second HARQ sent by the UE in a joint feedback mode, in response to the transmission parameter satisfying the third condition; or acquiring, through cooperation with the primary cell, the first HARQ and the second HARQ sent by the UE in a separate feedback mode, in response to the transmission parameter satisfying the third condition; or acquiring, through cooperation with the primary cell, the first HARQ and the second HARQ sent by the UE in a separate feedback mode, in response to the transmission parameter not satisfying the third condition.

13. A network device, comprising:

a memory, a processor, and a computer program stored in the memory and executable by the processor, wherein the computer program, when executed by the processor, causes the processor to perform the method for implementing cooperative communication of claim 8.

14. A non-transitory computer-readable storage medium, storing a computer-executable instruction which, when executed by a processor, causes the processor to perform the method for implementing cooperative communication of claim 8.

* * * * *